US012664713B2

(12) United States Patent
Bayer et al.

(10) Patent No.: US 12,664,713 B2
(45) Date of Patent: Jun. 23, 2026

(54) GENERATING TEXT-TO-MOTION ANIMATIONS FROM PARTIALLY ANNOTATED DATASETS

(71) Applicant: Snap Inc., Santa Monica, CA (US)

(72) Inventors: Karl Bayer, Brooklyn, NY (US); Gurunandan Krishnan Gorumkonda, Kirkland, WA (US); Mingdian Liu, Ames, IA (US); Bing Zhou, Rye, NY (US)

(73) Assignee: Snap Inc., Santa Monica, CA (US)

( * ) Notice: Subject to any disclaimer, the term of this patent is extended or adjusted under 35 U.S.C. 154(b) by 318 days.

(21) Appl. No.: 18/433,000

(22) Filed: Feb. 5, 2024

(65) Prior Publication Data

US 2025/0252637 A1      Aug. 7, 2025

(51) Int. Cl.
*G06T 13/40* (2011.01)
*G06N 3/0455* (2023.01)

(52) U.S. Cl.
CPC .......... *G06T 13/40* (2013.01); *G06N 3/0455* (2023.01)

(58) Field of Classification Search
CPC .............................. G06T 13/40; G06N 3/0455
See application file for complete search history.

(56) References Cited

U.S. PATENT DOCUMENTS

| | | | |
|---|---|---|---|
| 10,997,779 B2 * | 5/2021 | Chen ..................... | G06T 15/205 |
| 11,226,673 B2 * | 1/2022 | Wang ................... | G06N 3/0464 |
| 11,443,480 B2 * | 9/2022 | Fedyukov ............... | G06T 19/20 |
| 11,676,016 B2 * | 6/2023 | Baijal ................. | G06F 18/2415 |
| | | | 706/12 |
| 11,736,756 B2 * | 8/2023 | Vats ........................ | G06T 13/40 |
| | | | 345/473 |
| 11,978,142 B2 * | 5/2024 | Kang ..................... | G06T 13/40 |
| 12,190,637 B2 * | 1/2025 | Li .......................... | G06V 40/178 |
| 12,406,444 B2 * | 9/2025 | Zhou ..................... | G06T 19/006 |
| 12,423,896 B1 * | 9/2025 | Degtiarev .............. | G06T 13/80 |
| 12,511,848 B2 * | 12/2025 | Guler ..................... | G06T 19/20 |
| 2023/0377238 A1 * | 11/2023 | Hutton ................. | G06F 40/284 |
| 2024/0062467 A1 * | 2/2024 | Sarkis ................... | G06V 10/82 |
| 2024/0193747 A1 * | 6/2024 | Bradley ................. | G06T 17/00 |

(Continued)

OTHER PUBLICATIONS

Asakawa, Evaluation of text-to-gesture generation model using convolutional network, 2022, Elsevier, pp. 365-375. (Year: 2022).*

(Continued)

*Primary Examiner* — Cheng Yuan Tseng

(74) *Attorney, Agent, or Firm* — CM Law; Stephen J. Weed

(57) ABSTRACT

A two-stage approach for learning and generating an expressive text-to-motion animation from partially annotated datasets (T2M-X). In an example implementation, T2M-X builds a unified motion dataset based on partially annotated datasets. In the first stage, T2M-X uses the unified motion dataset to train three vector-quantized variational autoencoders (VQ-VAE) for body, hand, and face, respectively, and generate high-quality motion outputs. In the second stage, T2M-X uses the high-quality motion outputs to train a multi-indexing generative pre-trained transformer (GPT) model that includes motion consistency loss and sequence length consistency for learning and then generating coordinated and expressive animations.

20 Claims, 8 Drawing Sheets

Body Parts VQ-VAE Experts

Multi-Indexing GPT Model 150

(56) References Cited

U.S. PATENT DOCUMENTS

2024/0193891 A1\* 6/2024 Markhasin .............. G06T 19/20
2025/0061634 A1\* 2/2025 Huang .................... G06T 13/40
2025/0292472 A1\* 9/2025 Fang ........................ G06T 5/77

OTHER PUBLICATIONS

Bouali, A review of text-to-animation systems, 2023, IEEE Access, pp. 1-17. (Year: 2023).\*

Hyemin Ahn, Timothy Ha, Yunho Choi, Hwiyeon Yoo, and Songhwai Oh. Text2action: Generative Adversarial Synthesis from Language to Action. In 2018 IEEE International Conference on Robotics and Automation (ICRA), pp. 5915-5920. IEEE, 2018.

Chaitanya Ahuja and Louis-Philippe Morency. Language2pose: Natural Language Grounded Pose Forecasting. In 2019 International Conference on 3D Vision (3DV), pp. 719-728. IEEE, 2019.

Sadegh Aliakbarian, Fatemeh Sadat Saleh, Mathieu Salzmann, Lars Petersson, and Stephen Gould. A Stochastic Conditioning Scheme for Diverse Human Motion Prediction. In Proceedings of the IEEE/CVF Conference on Computer Vision and Pattern Recognition, pp. 5223-5232, 2020.

Andreas Aristidou, Anastasios Yiannakidis, Kfir Aberman, Daniel Cohen-Or, Ariel Shamir, and Yiorgos Chrysanthou. Rhythm is a Dancer: Music-Driven Motion Synthesis with Global Structure. IEEE Transactions on Visualization and Computer Graphics, 2022.

Nikos Athanasiou, Mathis Petrovich, Michael J Black, and Gul Varol. Teach: Temporal Action Composition for 3D Humans. In 2022 International Conference on 3D Vision (3DV), pp. 414-423. IEEE, 2022.

Kang Chen, Zhipeng Tan, Jin Lei, Song-Hai Zhang, Yuan-Chen Guo, Weidong Zhang, and Shi-Min Hu. Choreomaster: Choreography-Oriented Music-Driven Dance Synthesis. ACM Transactions on Graphics (TOG), 40 (4):1-13, 2021.

Xin Chen, Biao Jiang, Wen Liu, Zilong Huang, Bin Fu, Tao Chen, and Gang Yu. Executing Your Commands via Motion Diffusion in Latent Space. In Proceedings of the IEEE/CVF Conference on Computer Vision and Pattern Recognition, pp. 18000-18010, 2023.

Anindita Ghosh, Noshaba Cheema, Cennet Oguz, Christian Theobalt, and Philipp Slusallek. Synthesis of Compositional Animations from Textual Descriptions. In Proceedings of the IEEE/CVF international conference on computer vision, pp. 1396-1406, 2021.

Chuan Guo, Shihao Zou, Xinxin Zuo, Sen Wang, Wei Ji, Xingyu Li, and Li Cheng. Generating Diverse and Natural 3D Human Motions from Text. In Proceedings of the IEEE/CVF Conference on Computer Vision and Pattern Recognition, pp. 5152-5161, 2022.

Ruilong Li, Shan Yang, David A Ross, and Angjoo Kanazawa. AI Choreographer: Music Conditioned 3D Dance Generation with AIST++. In Proceedings of the IEEE/CVF International Conference on Computer Vision, pp. 13401-13412, 2021.

Wei-Hong Li, Xialei Liu, and Hakan Bilen. Learning Multiple Dense Prediction Tasks from Partially Annotated Data. In Proceedings of the IEEE/CVF Conference on Computer Vision and Pattern Recognition, pp. 18879-18889, 2022.

Jing Lin, Ailing Zeng, Shunlin Lu, Yuanhao Cai, Ruimao Zhang, Haoqian Wang, and Lei Zhang. Motion-X: A Large-scale 3D Expressive Whole-body Human Motion Dataset. Advances in Neural Information Processing Systems, 2023.

Yao Lu, Soren Pirk, Jan Dlabal, Anthony Brohan, Ankita Pasad, Zhao Chen, Vincent Casser, Anelia Angelova, and Ariel Gordon. Taskology: Utilizing Task Relations at Scale. In Proceedings of the IEEE/CVF Conference on Computer Vision and Pattern Recognition, pp. 8700-8709, 2021.

Thomas Lucas, Fabien Baradel, Philippe Weinzaepfel, and Gregory Rogez. Posegpt: Quantization-based 3D Human Motion Generation and Forecasting. In European Conference on Computer Vision, pp. 417-435. Springer, 2022.

Wei Mao, Miaomiao Liu, and Mathieu Salzmann. History re-peats itself: Human Motion Prediction via Motion Attention. In Computer Vision—ECCV 2020: 16th European Conference, Glasgow, UK, Aug. 23-28, 2020, Proceedings, Part XIV 16, pp. 474-489. Springer, 2020.

Long Ouyang, Jeffrey Wu, Xu Jiang, Diogo Almeida, Car-roll Wainwright, Pamela Mishkin, Chong Zhang, Sandhini Agarwal, Katarina Slama, Alex Ray, et al. Training Language Models to Follow Instructions with Human Feedback. Advances in Neural Information Processing Systems, 35: 27730-27744, 2022.

Georgios Pavlakos, Vasileios Choutas, Nima Ghorbani, Timo Bolkart, Ahmed A. A. Osman, Dimitrios Tzionas, and Michael J. Black. Expressive Body Capture: 3D Hands, Face, and Body from a Single Image. In Proceedings IEEE Conf. on Computer Vision and Pattern Recognition (CVPR), pp. 10975-10985, 2019.

Dario Pavllo, David Grangier, and Michael Auli. Quater-net: A Quaternion-based Recurrent Model for Human Motion. arXiv preprint arXiv:1805.06485, 2018.

Mathis Petrovich, Michael J Black, and Gul Varol. Action-Conditioned 3D Human Motion Synthesis with Transformer VAE. In Proceedings of the IEEE/CVF International Conference on Computer Vision, pp. 10985-10995, 2021.

Mathis Petrovich, Michael J Black, and Gul Varol. TEMOS: Generating Diverse Human Motions from Textual Descriptions. In European Conference on Computer Vision, pp. 480-497. Springer, 2022.

Matthias Plappert, Christian Mandery, and Tamim Asfour. The KIT Motion-Language Dataset. Big data, 4 (4):236-252, 2016.

Abhinanda R Punnakkal, Arjun Chandrasekaran, Nikos Athanasiou, Alejandra Quiros-Ramirez, and Michael J Black. BABEL: Bodies, Action and Behavior with English Labels. In Proceedings of the IEEE/CVF Conference on Computer Vision and Pattern Recognition, pp. 722-731, 2021.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning Transferable Visual Models from Natural Language Supervision. In International conference on machine learning, pp. 8748-8763. PMLR, 2021.

Li Siyao, Weijiang Yu, Tianpei Gu, Chunze Lin, Quan Wang, Chen Qian, Chen Change Loy, and Ziwei Liu. Bailando: 3D Dance Generation by Actor-Critic GPT with Choreographic Memory. In Proceedings of the IEEE/CVF Conference on Computer Vision and Pattern Recognition, pp. 11050-11059, 2022.

Sebastian Starke, Ian Mason, and Taku Komura. DeepPhase: Periodic Autoencoders for Learning Motion Phase Manifolds. ACM Transactions on Graphics (TOG), 41(4):1-13, 2022.

Omid Taheri, Nima Ghorbani, Michael J Black, and Dimitrios Tzionas. Grab: A Dataset of Whole-Body Human Grasping of Objects. In Computer Vision—ECCV 2020: 16th European Conference, Glasgow, UK, Aug. 23- 28, 2020, Proceedings, Part IV 16, pp. 581-600. Springer, 2020.

Xiangjun Tang, He Wang, Bo Hu, Xu Gong, Ruifan Yi, Qi-long Kou, and Xiaogang Jin. Real-time Controllable Motion Transition for Characters. ACM Transactions on Graphics (TOG), 41(4):1-10, 2022.

Guy Tevet, Brian Gordon, Amir Hertz, Amit H Bermano, and Daniel Cohen-Or. MotionCLIP: Exposing Human Motion Generation to Clip Space. In European Conference on Computer Vision, pp. 358-374. Springer, 2022.

Guy Tevet, Sigal Raab, Brian Gordon, Yonatan Shafir, Daniel Cohen-Or, and Amit H Bermano. Human Motion Diffusion Model. arXiv preprint arXiv:2209.14916, 2022.

Aaron Van Den Oord, Oriol Vinyals, et al. Neural Discrete Representation Learning. Advances in neural information processing systems, 30, 2017.

Ashish Vaswani, Noam Shazeer, Niki Parmar, Jakob Uszkoreit, Llion Jones, Aidan N Gomez, Łukasz Kaiser, and Illia Polosukhin. Attention is All You Need. Advances in neural information processing systems, 30, 2017.

Sara Zhalehpour, Onur Onder, Zahid Akhtar, and Cig-dem Eroglu Erdem. Baum-1: A Spontaneous Audio-Visual Face Database of Affective and Mental States. IEEE Transactions on Affective Computing, 8(3):300-313, 2016.

Jianrong Zhang, Yangsong Zhang, Xiaodong Cun, Shaoli Huang, Yong Zhang, Hongwei Zhao, Hongtao Lu, and Xi Shen. T2M-GPT:

(56) References Cited

OTHER PUBLICATIONS

Generating Human Motion from Textual Descriptions with Discrete Representations. arXiv preprint arXiv:2301.06052, 2023.

Mingyuan Zhang, Zhongang Cai, Liang Pan, Fangzhou Hong, Xinying Guo, Lei Yang, and Ziwei Liu. MotionDiffuse: Text-Driven Human Motion Generation with Diffusion Model. arXiv preprint arXiv:2208.15001, 2022.

Yi Zhou, Connelly Barnes, Jingwan Lu, Jimei Yang, and Hao Li. On the Continuity of Rotation Representations in Neural Networks. In Proceedings of the IEEE/CVF Conference on Computer Vision and Pattern Recognition, pp. 5745-5753, 2019.

Mingdian Liu, Yilin Liu, Gurunandan Krishnan, Karl S. Bayer, Bing Zhou; T2M-X: Learning Expressive Text-to-Motion Generation from Partially Annotated Data; arXiv: 2409.13251v1 [cs. CV] Sep. 20, 2024.

Evonne Ng, Sanjay Subramanian, Dan Klein, Angjoo Kanazawa, Trevor Darrell, and Shiry Ginosar; "Can Language Models Learn to Listen?," 2023 IEEE/CVF International Conference on Computer Vision (ICCV), IEEE, Oct. 1, 2023, pp. 10049-10059.

International Search Report and Written Opinion for International Application No. PCT/US2025/014327, dated May 20, 2025 (May 20, 2025)—11 pages.

Shunlin Lu, Ling-Hao Chen, Ailing Zeng, Jing Lin, Ruimao Zhang, Lei Zhang, and Heung-Yeung Shum; "HumanTomato: Text-Aligned Whole-Body Motion Generation," arXiv:2310.12978v1 [cs. CV] Oct. 19, 2023.

* cited by examiner

Multi-Indexing GPT Model 150

Body Parts VQ-VAE Experts

200

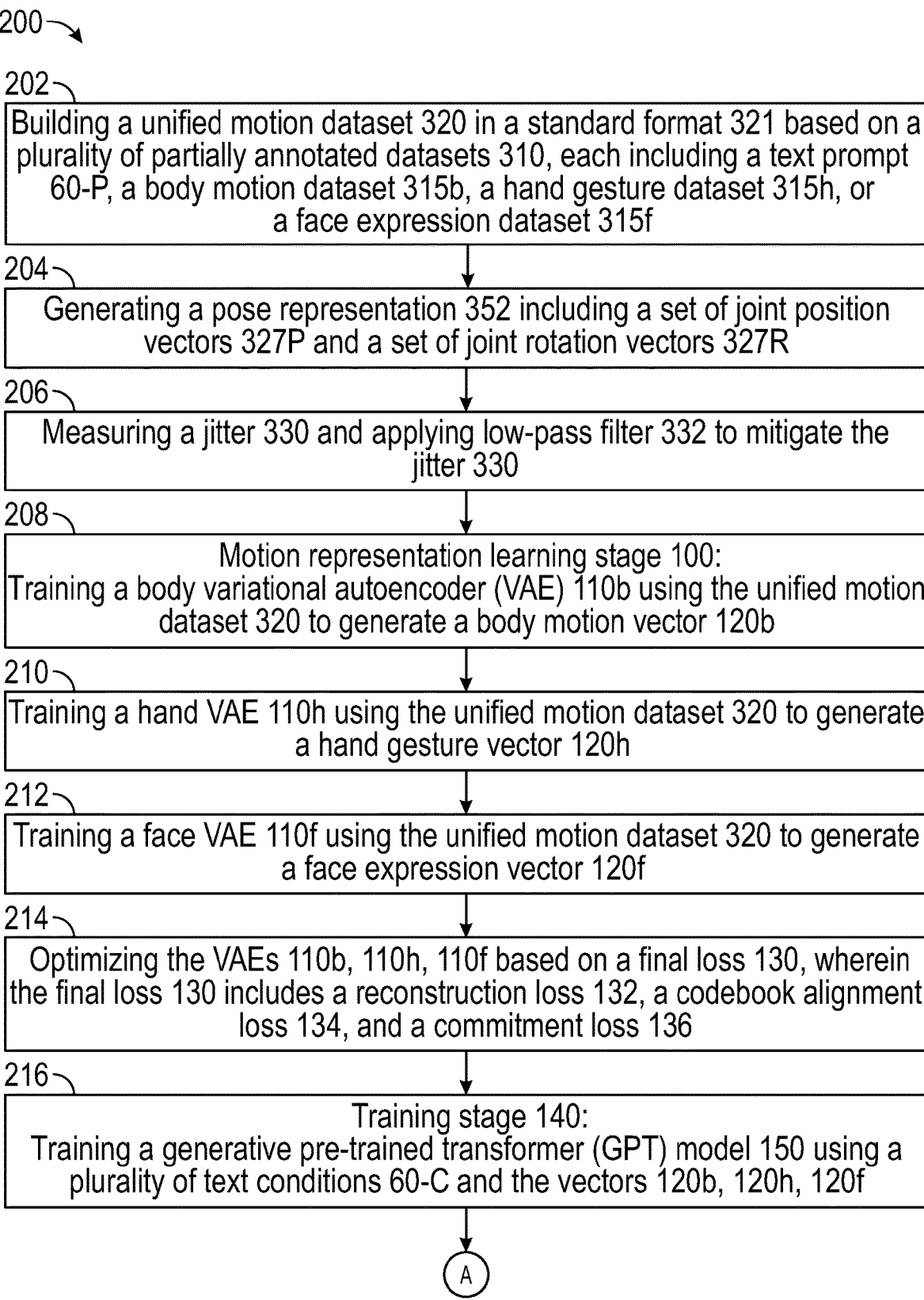

202
Building a unified motion dataset 320 in a standard format 321 based on a plurality of partially annotated datasets 310, each including a text prompt 60-P, a body motion dataset 315b, a hand gesture dataset 315h, or a face expression dataset 315f 204
Generating a pose representation 352 including a set of joint position vectors 327P and a set of joint rotation vectors 327R 206
Measuring a jitter 330 and applying low-pass filter 332 to mitigate the jitter 330

208
Motion representation learning stage 100:
Training a body variational autoencoder (VAE) 110b using the unified motion dataset 320 to generate a body motion vector 120b 210
Training a hand VAE 110h using the unified motion dataset 320 to generate a hand gesture vector 120h 212
Training a face VAE 110f using the unified motion dataset 320 to generate a face expression vector 120f 214
Optimizing the VAEs 110b, 110h, 110f based on a final loss 130, wherein the final loss 130 includes a reconstruction loss 132, a codebook alignment loss 134, and a commitment loss 136

216
Training stage 140:
Training a generative pre-trained transformer (GPT) model 150 using a plurality of text conditions 60-C and the vectors 120b, 120h, 120f

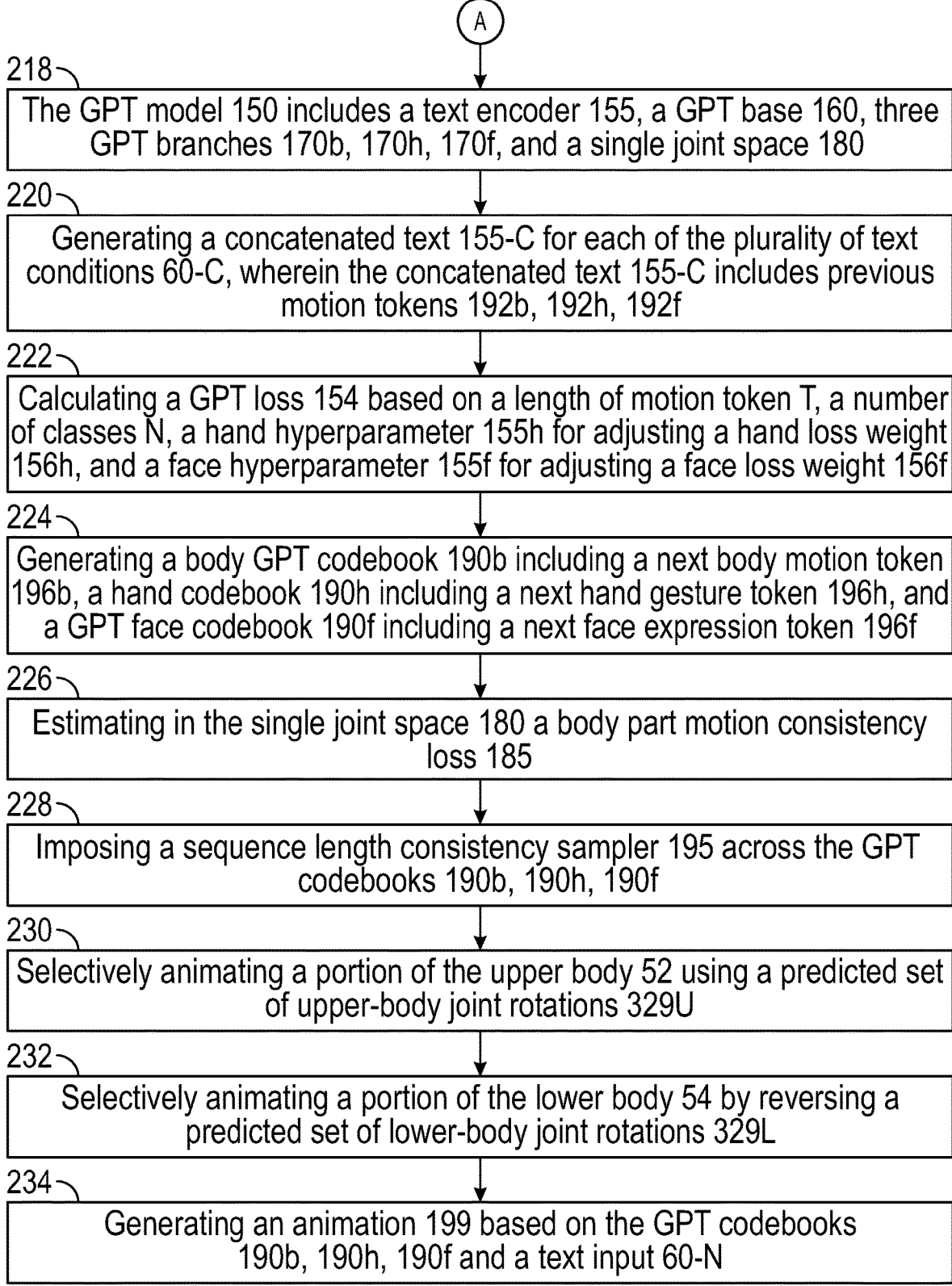

218 — The GPT model 150 includes a text encoder 155, a GPT base 160, three GPT branches 170b, 170h, 170f, and a single joint space 180

220 — Generating a concatenated text 155-C for each of the plurality of text conditions 60-C, wherein the concatenated text 155-C includes previous motion tokens 192b, 192h, 192f 222 — Calculating a GPT loss 154 based on a length of motion token T, a number of classes N, a hand hyperparameter 155h for adjusting a hand loss weight 156h, and a face hyperparameter 155f for adjusting a face loss weight 156f 224 — Generating a body GPT codebook 190b including a next body motion token 196b, a hand codebook 190h including a next hand gesture token 196h, and a GPT face codebook 190f including a next face expression token 196f 226 — Estimating in the single joint space 180 a body part motion consistency loss 185

228 — Imposing a sequence length consistency sampler 195 across the GPT codebooks 190b, 190h, 190f 230 — Selectively animating a portion of the upper body 52 using a predicted set of upper-body joint rotations 329U 232 — Selectively animating a portion of the lower body 54 by reversing a predicted set of lower-body joint rotations 329L 234 — Generating an animation 199 based on the GPT codebooks 190b, 190h, 190f and a text input 60-N

| Dataset | Sequence | Frame | Duration | Word | Modality |
|---|---|---|---|---|---|
| HumanML3D | 29.2K | 7.1M | 57.2h | 2.02M | B |
| BAUM | 1.4K | 0.2M | 1.9h | - | F |
| Mixamo | 4.5K | 1.1M | 2.6h | 0.26M | B,H |
| GRAB | 2.7K | 3.2M | 7.4h | 0.49M | B,H |
| IDEA400 | 25.0K | 5.2M | 48.1h | 1.19M | B,H,F |
| Total | 61.4K | 16.6M | 115.3h | 3.96M | - |

| Methods | R-Precision ↑ | | | FID ↓ | MM Dist ↓ | Diversity ↑ | MModality ↑ |
|---|---|---|---|---|---|---|---|
| | Top-1 | Top-2 | Top-3 | | | | |
| Real | 0.474±0.003 | 0.684±0.006 | 0.778±0.008 | 0.000±0.000 | 3.121±0.004 | 11.392±0.188 | - |
| VQVAE | 0.385±0.004 | 0.627±0.006 | 0.736±0.005 | 0.640±0.015 | 3.812±0.036 | 11.330±0.173 | - |
| T2M-GPT | 0.288±0.003 | 0.554±0.007 | 0.654±0.008 | 2.543±0.008 | 4.784±0.046 | 10.747±0.239 | 1.753±0.013 |
| T2M-X w/o cl | 0.297±0.004 | 0.572±0.011 | 0.663±0.014 | 2.273±0.009 | 4.529±0.029 | 10.357±0.118 | 1.929±0.035 |
| T2M-X w/ cl | 0.327±0.006 | 0.591±0.009 | 0.725±0.009 | 1.753±0.010 | 4.028±0.039 | 10.719±0.153 | 2.265±0.024 |

| Train Set | HumanML3D (Test) | | | | T2M-X Dataset (Test) | | | |
|---|---|---|---|---|---|---|---|---|
| | R-Precision ↑ | FID ↓ | Diversity ↑ | MModality ↑ | R-Precision ↑ | FID ↓ | Diversity ↑ | MModality ↑ |
| Real | 0.731±0.003 | 0.000±0.000 | 10.422±0.099 | - | 0.778±0.008 | 0.000±0.000 | 11.392±0.188 | - |
| HumanML3D | 0.605±0.006 | 1.277±0.071 | 10.182±0.084 | 1.072±0.074 | 0.515±0.011 | 8.184±0.156 | 9.034±0.109 | 0.826±0.016 |
| T2M-X Dataset | 0.633±0.006 | 2.762±0.081 | 10.820±0.133 | 1.344±0.064 | 0.654±0.008 | 2.543±0.008 | 10.747±0.239 | 1.753±0.013 |

| Modality Pair (a,b) | Methods | R-Precision ↑ | | MM Dist ↓ | FID ↓ | |
|---|---|---|---|---|---|---|
| | | b→a | a→b | | a | b |
| Body, Hand | Real | 0.733±0.002 | 0.717±0.004 | 3.514±0.013 | 0.000±0.000 | 0.000±0.000 |
| | w/o cl | 0.620±0.014 | 0.594±0.012 | 5.726±0.085 | 2.339±0.021 | 3.487±0.035 |
| | w/ cl | 0.701±0.005 | 0.659±0.008 | 3.836±0.020 | 1.632±0.017 | 3.008±0.028 |
| Body, Face | Real | 0.718±0.007 | 0.682±0.005 | 3.974±0.024 | 0.000±0.000 | 0.000±0.000 |
| | w/o cl | 0.617±0.017 | 0.572±0.056 | 5.222±0.087 | 3.354±0.045 | 2.247±0.032 |
| | w/ cl | 0.704±0.042 | 0.612±0.036 | 4.457±0.056 | 3.575±0.060 | 1.755±0.023 |
| Head, Face | Real | 0.643±0.013 | 0.631±0.009 | 4.535±0.033 | 0.000±0.000 | 0.000±0.000 |
| | w/o cl | 0.594±0.033 | 0.537±0.026 | 5.626±0.086 | 3.850±0.091 | 2.247±0.032 |
| | w/ cl | 0.618±0.027 | 0.572±0.018 | 5.420±0.095 | 3.372±0.079 | 1.755±0.023 |

| $\eta_1$ | $\eta_2$ | Text to Body Motion | | Text to Hand Motion | | Text to Face Motion | |
|---|---|---|---|---|---|---|---|
| | | FID↓ | Top-3↑ | FID↓ | Top-3↑ | FID↓ | Top-3↑ |
| 0.05 | 0.05 | 2.265±0.014 | 0.661±0.006 | 2.735±0.027 | 0.539±0.009 | 2.974±0.018 | 0.530±0.015 |
| 0.05 | 0.1 | 2.275±0.009 | 0.657±0.003 | 2.687±0.018 | 0.511±0.016 | 2.983±0.012 | 0.557±0.007 |
| 0.05 | 0.5 | 2.426±0.017 | 0.605±0.008 | 2.704±0.014 | 0.554±0.008 | 2.811±0.022 | 0.633±0.010 |
| 0.1 | 0.05 | 2.267±0.017 | 0.652±0.002 | 2.585±0.021 | 0.570±0.014 | 2.905±0.011 | 0.598±0.008 |
| 0.1 | 0.1 | 2.273±0.025 | 0.663±0.005 | 2.574±0.019 | 0.584±0.007 | 2.825±0.016 | 0.628±0.011 |
| 0.1 | 0.5 | 2.289±0.017 | 0.644±0.009 | 2.586±0.025 | 0.568±0.009 | 2.815±0.009 | 0.635±0.011 |
| 0.5 | 0.05 | 2.341±0.011 | 0.647±0.011 | 2.581±0.012 | 0.589±0.007 | 2.914±0.017 | 0.544±0.023 |
| 0.5 | 0.1 | 2.378±0.014 | 0.624±0.004 | 2.578±0.024 | 0.586±0.004 | 2.829±0.024 | 0.630±0.017 |
| 0.5 | 0.5 | 2.619±0.027 | 0.573±0.007 | 2.556±0.021 | 0.593±0.011 | 2.825±0.015 | 0.631±0.014 |

| $\lambda_1$ | $\lambda_2$ | $\lambda_3$ | Top-3 R-Precision | | | | | |
|---|---|---|---|---|---|---|---|---|
| | | | Hand→Body | Body→Hand | Face→Body | Body→Face | Face→Hand | Hand→Face |
| 0.1 | 0.1 | 0.1 | 0.612±0.036 | 0.607±0.035 | 0.590±0.035 | 0.601±0.035 | 0.584±0.014 | 0.527±0.011 |
| 0.1 | 0.1 | 0.5 | 0.616±0.019 | 0.624±0.021 | 0.635±0.030 | 0.608±0.028 | 0.629±0.049 | 0.559±0.010 |
| 0.1 | 0.5 | 0.1 | 0.635±0.014 | 0.619±0.012 | 0.621±0.034 | 0.563±0.016 | 0.593±0.026 | 0.565±0.016 |
| 0.1 | 0.5 | 0.5 | 0.667±0.012 | 0.601±0.010 | 0.637±0.038 | 0.570±0.011 | 0.559±0.014 | 0.587±0.022 |
| 0.5 | 0.1 | 0.1 | 0.628±0.042 | 0.646±0.009 | 0.572±0.043 | 0.598±0.009 | 0.628±0.049 | 0.552±0.028 |
| 0.5 | 0.1 | 0.5 | 0.640±0.049 | 0.659±0.032 | 0.618±0.038 | 0.604±0.007 | 0.593±0.018 | 0.582±0.010 |
| 0.5 | 0.5 | 0.1 | 0.701±0.005 | 0.659±0.008 | 0.624±0.042 | 0.612±0.036 | 0.618±0.027 | 0.572±0.018 |
| 0.5 | 0.5 | 0.5 | 0.642±0.018 | 0.643±0.010 | 0.632±0.019 | 0.602±0.024 | 0.604±0.008 | 0.586±0.036 |

GENERATING TEXT-TO-MOTION ANIMATIONS FROM PARTIALLY ANNOTATED DATASETS

TECHNICAL FIELD

Examples set forth in the present disclosure relate to machine learning, generative models, and training datasets. More particularly, but not by way of limitation, the present disclosure describes building a unified motion dataset based on partially annotated datasets, using the unified motion dataset to train a set of variational autoencoders (VAE) to generate high-quality motion outputs, and using the motion outputs to train a GPT model to generate coordinated and expressive whole-body animations.

BACKGROUND

Machine learning refers to mathematical models or algorithms that improve incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

Text-to-motion refers to the task of generating a movement (e.g., the animation of an avatar, a Bitmoji, a virtual character, the motion of a robot) in response to a text input, such as characters typed on a keyboard and input that can be converted to text (e.g., acronyms, spoken audio, representative icons such as emoji). The output motion is expected to perform the text input in a way that comports with the laws of physics and known capabilities (e.g., avatar parameters, human abilities, robot limitations).

Data annotation refers to the process of reviewing a source (e.g., text files, images, video clips, data), detecting certain types of content found in the source, and then associating tags about the content with the source. A tag refers to a label or other identifier that describes the detected content. A source file that includes stored tags is referred to as annotated data. In the context of machine learning, annotated data helps the model learn more efficiently and completely, especially when the stored tags are closely related to the particular machine-learning models being trained.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added upper- or lower-case letter referring to a specific element. When referring to a non-specific one or more elements the added letter may be omitted.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures:

FIG. 2 is a flow chart listing the steps in an example method of building a unified motion dataset, generating training datasets, training a GPT model, and generating an animation;

FIG. 3 is a table of data related to partially annotated datasets and a unified motion dataset;

FIG. 4 is a table of data associated with different methods;

FIG. 6A is a table of evaluation data;

FIG. 6B is a table of evaluation data associated with modality pairs;

FIG. 7 is a table of data associated with a set of two hyperparameters; and

DETAILED DESCRIPTION

Figures 1A, 1B:
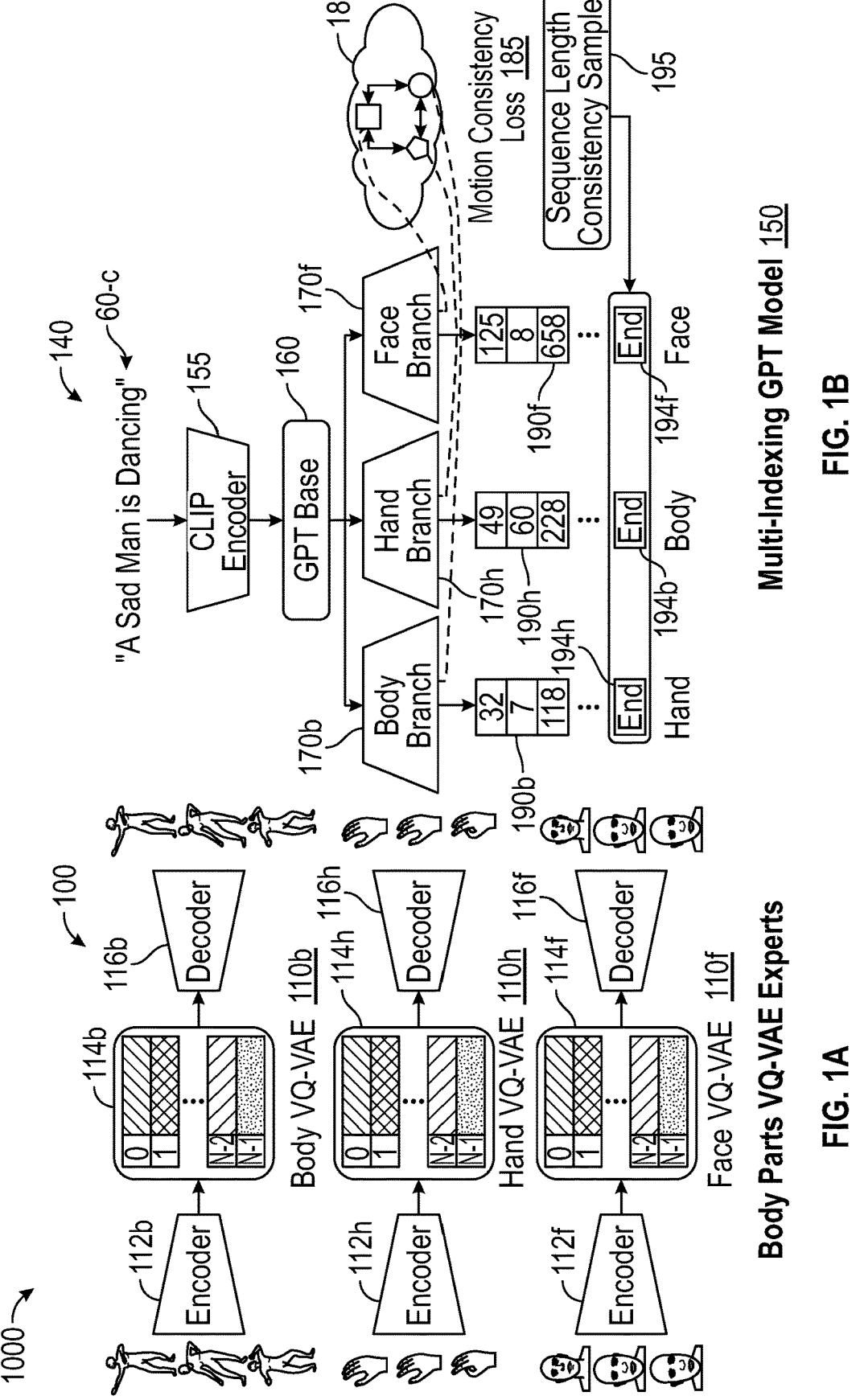
FIGS. 1A and 1B are a block diagrams of an example system for generating an animation which includes a motion representation learning stage and a training stage.

Examples of improved two-stage learning and generating for an expressive text-to-motion animation from partially annotated datasets are described herein, which are referred to generally as Text-to-Motion-X (T2M-X). In an example implementation, T2M-X builds a unified motion dataset based on partially annotated datasets. In the first stage, T2M-X uses the unified dataset to train three vector-quantized variational autoencoders (VQ-VAE) for body, hand, and face, respectively, and generate high-quality motion outputs. In the second stage, T2M-X uses the high-quality motion outputs to train a multi-indexing generative pre-trained transformer (GPT) model that includes motion consistency loss and sequence length consistency for learning and then generating coordinated and expressive animations.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on"

means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

In general, a vector-quantized variational autoencoder (VQ-VAE) is a type of machine-learning model that has an artificial neural network architecture. Autoencoders are applied in many contexts, including facial recognition and feature detection. Autoencoders are also used as generative models which can generate new training datasets. A VAE includes an input (x), an encoder, a code or codebook (written to a latent space using variables or vectors), a decoder, and an output (x-prime). The encoder maps the input data to the codebook in the latent space. The decoder receives samples from the latent space and uses the codebook to reconstruct the data and generate the output. The output can be used for a variety of purposes, including the generation of training datasets suitable for training other machine-learning models.

FIGS. 1A and 1B are block diagrams of an example system 1000 for generating an animation which includes a motion representation learning stage 100 and a training stage 140.

The two-stage system 1000 transforms a text input into an expressive whole-body dataset in a standard format (e.g., SMPL-X). As shown in FIG. 1A, the learning stage 100 includes three vector-quantized variational autoencoders (VQ-VAE), each decoding a different body part movement (e.g., body, hand, face) into index sequences. The training stage 140 includes a multi-indexing GPT model 150 that predicts whole-body motion sequences from a text input, which the VAE decoders then convert into motion data. To ensure consistency across the motion modalities (e.g., body, hand, face), a motion consistency loss function is utilized during training.

The motion representation learning stage 100 in some implementations includes three vector-quantized variational autoencoders (VQ-VAE): a body VAE 110b, a hand VAE 110h, and a face VAE 110f. In general, a reference numeral that includes an added letter "b" refers to body elements, "h" refers to hand elements, and "f" refers to face elements.

The body VAE 110b in some implementations includes a body encoder 112b, a body codebook 114b, and a body decoder 116b.

The hand VAE 110h in some implementations includes a hand encoder 112h, a hand codebook 114h, and a hand decoder 116h.

The face VAE 110f in some implementations includes a face encoder 112f, a face codebook 114f, and a face decoder 116f.

Because most of the available datasets are partially annotated, as described herein, the learning stage 100 includes a separate VQ-VAE expert model for each of the three modalities (e.g., body, hand, face). The models 110b, 110h, 110f are trained on high-quality motion datasets (e.g., a unified dataset 320 as described herein) and each model projects the original data into a codebook 114b, 114h, 114f in sparse representation. For example, a series of human motion data can be presented as:

$$M^p \in \mathbb{R}^{T \times d_m^p},$$

where $M^p$ represents the partial motion data for body (p=1), hand (p=2), and face (p=3), T represents a number of frames, and $$d_m^p$$

represents a data dimension of the motion modality.

The learning stage 100 in some implementations leverages the encoder-decoder of several one-dimensional convolutional layers to compress the whole motion dataset for each modality into a learnable codebook:

$$C^p \in \mathbb{R}^{K^p \times d_c^p},$$

where $K^p$ and $$d_c^p$$

represent the length and dimension of the codebook and p represents the modality index (e.g., 1 for body, 2 for hand, 3 for face).

As for the partial motion data $M^p$ for each modality, the latent vector extracted from the encoder is denoted as:

$$z^p \in \mathbb{R}^{T' \times d_c^p},$$

where T-prime equals T divided by l (where l represents the down-sampling rate of the encoder in the temporal domain) and where $$d_c^p$$

represents the vector dimension (e.g., the same as that of the codebook).

Each VAE in some implementations is vector quantized. To quantize the i-th latent vector $z_i$, a closest vector in the codebook can be represented by the following Equation 1:

$$\hat{z}_i^p = \arg\min_{c_k^p \in C^p} \|z_i^p - c_k^p\|_2 \in \mathbb{R}^{d_c^p} \tag{1}$$

and the index of the vector in the codebook is recorded as the motion token:

$$t_{m,i}^p \in \mathbb{R}^1.$$

In general, the motion $M^P$ is projected into $z^P$ by the encoder, quantized as $\hat{z}^P$ by the codebook, and also represented by the motion token $$t_m^p.$$

In this aspect, referring again to FIG. 1A, the body VAE 110*b* generates a quantized body motion vector 120*b* ($\hat{z}^1$), the hand VAE 110*h* generates a quantized hand gesture vector 120*h* ($\hat{z}^2$), and the face VAE 110*f* generates a quantized face expression vector 120*f* ($\hat{z}^3$). Each quantized vector 120*b*, 120*h*, 120*f* can also be represented by its corresponding motion token $$t_m^p.$$

The quantized vector $\hat{z}^P$ will be used by the decoder, which operates with an architecture opposite that of the encoder, to reconstruct the motion data $\hat{M}^P$ and the motion token $$t_m^p$$

will be fed into the multi-indexing GPT model 150 for model training, as described herein.

The learning stage 100 and motion vectors 120 are described in FIG. 2 in the context of example method steps.

FIG. 2 is a flow chart 200 listing the steps in an example method of generating an animation. Although the steps are described in the context of training VAE expert models and training a GPT model, other uses and implementations of the steps described, for other types of system, will be understood by one of skill in the art from the description herein. One or more of the steps shown and described may be performed simultaneously, in a series, in an order other than shown and described, or in conjunction with additional steps. Some steps may be omitted or, in some applications, repeated.

Block 202 in FIG. 2 recites an example step of building a unified motion dataset 320 as described herein.

Block 204 in FIG. 2 recites an example step of generating a pose representation 352 that includes a set of joint position vectors 327P and a set of joint rotation vectors 327R. The pose representation 352 in some implementations is generated during the building of the unified motion dataset 320 (block 202) as described herein. The pose representation 352 is useful in addressing motion jitter during the animating process, as described herein. Motion jitter may be produced when using lower-quality datasets.

Block 206 in FIG. 2 recites an example step of measuring a jitter 330 in the motion data (e.g., across the set of GPT codebooks 190, as described herein) by quantifying one or more high-frequency components; and then applying a low-pass filter 332 to mitigate those components. In most instances, a motion jitter in a root joint influences all body joint positions, but the local joint rotations are unaffected by propagated error. Another example step of the process includes generating a pose representation 325 having six degrees of freedom, which incorporates both SMPL-X joint rotations and joint positions. The GPT model 150 predicts both rotations and positions during inference.

Block 208 recites an example step of training a body VAE 110*b* using the unified motion dataset 320 to generate a body motion vector 120*b*. Block 210 recites an example step of training a hand VAE 110*h* using the unified motion dataset 320 to generate a hand gesture vector 120*h*. Block 212 recites an example step of training a face VAE 110*b* using the unified motion dataset 320 to generate a face expression vector 120*f*.

Block 214 recites an example step of optimizing the VAEs 110*b*, 110*h*, 110*f* based on a final loss 130. The motion representation learning stage 100 in some implementations includes a process for optimizing the VAE models 110*b*, 110*h*, 110*f* based on a final loss 130. In some implementations, the final loss 130 includes a standard reconstruction loss 132 associated with the data reconstruction described herein, a codebook alignment loss 134 to update the codebook vector, and a commitment loss 136 to penalize the gap between the output vector from the encoder and the closest vector in the codebook.

The final loss 130 can be expressed using the following equation 2:

$$\mathcal{L}_{vq}^p = \mathcal{L}_{re}^p + \|sg[z^p] - \hat{z}^p\|_2 + \beta\|z^p - sg[\hat{z}^p]\|_2 \tag{2}$$

where beta ($\beta$) represents a hyper-parameter associated with the commitment loss 136 and where sg is the symbol for the stop-gradient operator. The reconstruction loss 132 in some implementations includes a smooth L1 loss for all the motion modalities and an additional loss related to the body motion velocity $V(M^P)$ in order to mitigate jitter, as described herein. The reconstruction loss 132 can be expressed using the following equation 3:

$$\mathcal{L}_{re}^p = \left\|M^p - \hat{M}^P\right\|_1 + \alpha\left\|V(M^P) - V(\hat{M}^P)\right\| \tag{3}$$

where alpha ($\alpha$) represents a parameter associated with the additional loss. In some implementations, the value of alpha ($\alpha$) is set at 0.5 for body motion, zero for hand motion, and zero for face motion.

Referring to FIG. 1B, the training stage 140 in some implementations includes a multi-indexing generative pre-trained transformer (GPT) model 150.

Block 216 in FIG. 2 recites an example step of training the GPT model 150 using a plurality of text conditions 60-C and the quantized motion vectors 120*b*, 120*h*, 120*f*. In some implementations, the training stage 140 starts with training the GPT model 150.

Block 218 in FIG. 2 recites an example step of constructing the GPT model 150 so that it includes, in some implementations, a text encoder 155 (for processing each text condition 60-C), a GPT base 160, and a set of three GPT branches 170. In one aspect, the base and branch architecture enables a partial back-propagation across the GPT model 150.

The GPT branches 170 in some implementations include a body GPT branch 170*b*, a hand GPT branch 170*h*, and a face GPT branch 170*f*. As shown in FIG. 1B, the body GPT branch 170*b* includes a GPT body codebook 190*b* and a body stop token 194*b*. The hand GPT branch 170*h* includes a GPT hand codebook 190*h* and a hand stop token 194*h*. The face GPT branch 170*f* includes a GPT face codebook 190*f* and a face stop token 194*f*.

The GPT model 150 in some implementations includes a single joint space 180, a body motion consistency loss 185, and a sequence length consistency sampler 195 as described herein.

Block 220 in FIG. 2 recites an example step of generating a concatenated text 155-C for each of a plurality of text conditions 60-C. The concatenated text 155-C in some implementations includes previous motion tokens, as described herein.

Block 222 in FIG. 2 recites an example step of calculating a GPT loss 154 based on a length of motion token T, a number of classes N, and hyperparameters, as described in the equations below.

The GPT base 160 in some implementations processes the concatenated text 155-C while the GPT branches 170 predict the next motion token 196 for each of the three modalities. Block 224 in FIG. 2 recites an example step of generating a GPT body codebook 190b, a GPT hand codebook 190h, and a GPT face codebook 190f. In some implementations, the GPT body codebook 190b includes a next body motion token 196b, the GPT hand codebook 190h includes a next hand gesture token 196h, and the GPT face codebook 190f includes a next face expression token 196f. In this aspect, the GPT model 150 functions simultaneously as a generator and a coordinator of the token indices in the VAE expert models 110, a feature referred to herein as multi-indexing.

Block 226 in FIG. 2 recites an example step of estimating, in the single joint space 180, a body motion consistency loss 185.

Block 228 in FIG. 2 recites an example step of imposing a sequence length consistency sampler 195 across the GPT codebooks 190, as described herein.

Block 234 in FIG. 2 recites an example step of generating an animation 199 based on the GPT codebooks 190 and a text input 60-N. In the context of the GPT model 150, the process of submitting a new text input 60-N and generating an animation 199 can be referred to as an inference. The process of generating an animation 199 in some implementations includes building a wireframe model of a character body (e.g., positions and rotations of joints, limbs, features) and then rendering the character around the wireframe in accordance with related parameters. The output data produced by the GPT model 150 is useful in a variety of applications and processes for generating an animation 199 in response to a text input. Generating an animation 199 as described herein includes, for example, animating the motion of an avatar, a Bitmoji, an icon, a virtual character, a robot, and a variety of other elements.

In some implementations, the GPT model 150 conditions the future or next motion on the previous body motion. Previous motion tokens are part of the example step described at block 220. For example, given a text condition 60-C and a set of three token sequences (also referred to herein as vectors 120, including the body motion vector 120b ($\hat{z}^1$), the hand gesture vector 120h ($\hat{z}^2$), and the face expression vector 120f ($\hat{z}^3$), the GPT model 150 is trained to align the predicted probability distribution:

$$\hat{P}_t^p = P\left(\hat{z}_t^p \mid c, \hat{z}_1^1, \ldots, \hat{z}_{t-1}^1\right)$$

to the ground truth distribution for body, hand, and face motions. In some implementations, the GPT model 150 adds a special "End" stop token 194 to the end of the motion tokens to indicate the end of a particular motion.

In some implementations, the GPT model 150 includes calculating a GPT loss 154 (block 222 of FIG. 2). The GPT loss function 154 ($L_{GPT}$) includes three cross-entropy losses and can be expressed using the following equation 4:

$$\mathcal{L}_{GPT} = \frac{1}{T+1} \sum_{t=1}^{T+1} \sum_{n=1}^{N_1+1} \left[-P_{tn}^1 \log \hat{P}_{tn}^1\right] \tag{4}$$
$$+ n_1 \cdot \frac{1}{T+1} \sum_{t=1}^{T+1} \sum_{n=1}^{N_2+1} \left[-P_{tn}^2 \log \hat{P}_{tn}^2\right]$$
$$+ n_2 \cdot \frac{1}{T+1} \sum_{t=1}^{T+1} \sum_{n=1}^{N_3+1} \left[-P_{tn}^3 \log \hat{P}_{tn}^3\right]$$

where T represents a length of motion token, N represents the number of classes for the motion tokens, and the eta values ($\eta_1$ and $\eta_2$) represent hyperparameters for adjusting the loss weight related to hand motion and facial expression, respectively. In some implementations, $\eta_1$ represents a hand hyperparameter 155h for adjusting a hand loss weight 156h associated with the hand motion, and $\eta_2$ represents a face hyperparameter 155f for adjusting a face loss weight 156f associated with the face expression. Block 222 in FIG. 2 recites an example step of calculating a GPT loss 154 based on a length of motion token T, a number of classes N, a hand hyperparameter 155h for adjusting a hand loss weight 156h associated with the hand motion, and a face hyperparameter 155f for adjusting a face loss weight 156f.

In some implementations, the text encoder 155 (e.g., a CLIP encoder) generates a concatenated text 155-C. Referring again to FIG. 2, block 220 recites an example step of generating a concatenated text 155-C using the text encoder 155 (e.g., a CLIP encoder). In some implementations the concatenated text 155-C includes the text condition 60-C along with a set of previous motion tokens 192 (e.g., a previous body motion token 192b, a previous hand gesture token 192h, and a previous face expression token 192f). The previous motion tokens 192 are added to the text embedding to predict the future motions.

In order to leverage the token relevance that was learned in the body VAE 110b, the token embedding from the fixed codebook is input to the GPT base 160 as previous body motion tokens. In a related aspect, the concatenated text embedding and the motion embedding are fed into transformer layers for feature extraction. Because the multi-indexing GPT model 150 operates in an auto-regressive manner, the causal self-attention is utilized in the transformer layer to establish the computational dependency among sequential elements of data The self-attention formula can be expressed using the following equation 5:

$$\text{Attention}\,(Q, K, V) = \text{Softmax}\left(\frac{QK^T \times M}{\sqrt{d_k}}\right)V \tag{5}$$

where Q, K, V denote the query, key, and value, respectively, from the input data. M represents a causal mask, which only allows the previous motion data tokens to be used when computing the next or current state of the motion tokens. The extracted feature from the GPT base 160 is fed into the GPT branches 170 to generate the next motion tokens 196. The GPT branches 170 share the same configuration for transformer lawyers as the GPT base 160 except a linear layer is attached to the GPT branches 170 to enable the calculation of the Softmax function above.

During the model training stage 140, the partially annotated datasets are processed first, in some implementations, to enable effective back-propagation throughout the entire GPT model 150. In some implementations, the training data is organized into batches in a way that ensures that each batch contains at least one sample from each data modality (e.g., body, hand, or face). Two masks are also stored in the batch data to indicate the presence or absence of hand motion and face motion in each data sample. Based on the two masks, an average final loss for each modality can be computed according to equation 7, below. In this aspect, the model weights in all the GPT branches 170 are updated with each batch of data, thereby enhancing the stability of the training process. During the inference stage, the "End" stop tokens 194 may appear earlier in the hand motion or the face motion, compared to the body motion. In order to maintain consistency in sequence length across the different modalities, the GPT model 150 includes a sequence length consistency sampler 195. In some implementations, when a stop token 194 appears prematurely (relative to the other body parts), the sequence length consistency sampler 195 replaces the stop token 194 from a predicted hand/face sequence with a token of the second-highest probability. In this aspect, the complete body motion, hand motion, and facial expression can be generated at the same time, conditioned on the next prompt.

Generating data across multiple modalities (e.g., body, hand, face) represents a form of multi-task learning, in which cross-task relations are adapted into multi-modal generative models through consistency learning. As described herein, the system 1000 addresses the limitations of partially annotated data and uses a generative GPT model 150. The GPT model 150 as described herein includes learning a single joint space 180 specifically for motion data across the three modalities (e.g., body, hand, face) and includes a feature extractor based on the GRU layer (gated recurrent unit) which takes into account the previous motion, which improves sequence data generation.

One of the challenges is ensuring consistency between and among the generated motion tokens for body, hand, and face. The models may not fully capture the joint distribution of all motion types across the entire dataset. To meet this challenge, the GPT model 150 in some implementations includes a single joint space 180 for body motion, hand gestures, and facial expressions, as shown in FIG. 1B. Using a single joint space 180 helps ensure coherence between and among the generated motions. In some implementations, a particular GRU layer is used as a feature extractor for each modality, thereby mapping the motion tokens into corresponding embedding spaces. For processing these tokens, the single joint space 180 applies a one-hot encoding followed by concatenation with the classification probabilities from the GPT branches 170. This approach not only ensures the GRU layer effectively learns the feature mappings across the entire motion sequence, but also enables the back-propagation of the loss in the joint space 180 to the GPT model 150 for weight updating. In general, for a ground truth motion data of T tokens, a consistency loss 185 (block 226 in FIG. 2) can be expressed using the following equation 6:

$$\mathcal{L}^t_{Consist} = \lambda_1 \mathcal{L}_{cl}(e^1_t, e^2_t) + \lambda_2 \mathcal{L}_{cl}(e^1_t, e^3_t) + \lambda_3 \mathcal{L}_{cl}(e^2_t, e^3_t) \tag{6}$$

A final loss can be expressed using the following equation 7:

$$\mathcal{L}_{Final} = \mathcal{L}_{GPT} + \frac{1}{T+1} \sum_{t=1}^{T+1} \mathcal{L}^t_{Consist} \tag{7}$$

where $$e^1_t, e^2_t, e^3_t$$

represent the features extracted from the GRU layers for body, hand, and face, respectively. $L_{CL}$ represents a contrastive loss. The lambda values $\lambda_1$, $\lambda_2$, $\lambda_3$ represent hyperparameters associated with the modality matching losses.

The GPT model 150 in some implementations includes a process for addressing motion jitter. For example, as described at block 204, above, the example process of building the unified motion dataset 320 includes generating a pose representation 352. Block 206, above, describes the example process of measuring the jitter 330 and applying a filter 332. Block 230 in FIG. 2 recites an example step of selectively animating the upper body 52 using a predicted set of upper-body joint rotations 329U for a smoother outcome. The upper-body joint rotations 329U in some implementations can be estimated based on the pose representation 352, which includes a set of joint position vectors 327P and a set of joint rotation vectors 327R. Similarly, the data in the pose representation 352 is useful in a variety of other animation processes. For example, block 232 in FIG. 2 recites an example step of selectively animating the lower body 54 using the reversed lower body joint rotations 329L and joint positions associated with the legs (e.g., to ensure consistency between foot positions and root translations, thereby also minimizing foot sliding.) In this aspect, the process of mitigating jitter in some implementations is part of generating an animation 199 (block 234).

In the context of text-to-motion computational modeling, the models need to accurately learn and execute a mapping from a linguistic space (e.g., text input) to a motion space. The text-to-motion models are limited by the quality and quantity of available datasets. The existing datasets are partially annotated. As used herein, the term "partially annotated" refers to and includes datasets that include text inputs of varying quality (e.g., short, partial, or incomplete descriptions) and annotations related to one or more modalities (e.g., body, hand, face) but not all three. Models trained with partially annotated datasets produce animations with missing elements (e.g., body motion without any hand gestures, or with expressionless or distorted faces). Recent efforts to extract missing motions, to augment the annotations, or to insert default or approximate annotations have produced low-quality results.

The system 1000 in some implementations uses a number of partially annotated datasets and builds a high-quality unified motion dataset 320 in a standard format 310 (e.g., SMPL-X). Block 202 in FIG. 2 recites an example step of building a unified motion dataset 320 in a standard format 310 based on a plurality of partially annotated datasets 310. Each of the partially annotated datasets 310 generally includes at least one of the following elements: a text prompt 60-P, a body motion dataset 315*b* with or without body annotations, a hand gesture dataset 315*h* with or without hand annotations, or a face expression dataset 315*f* with or without face annotations. This example step is shown first in FIG. 2 because the process of building a unified motion dataset 320 in some implementations is accomplished before the learning stage 100 and the training stage 140. each including at least one of the following elements: a text prompt 60-P, a body motion dataset 315*b* with or without body annotations, a hand gesture dataset 315*h* with or without hand annotations, or a face expression dataset 315*f* with or without face annotations.

FIG. 3 is a table 300 of statistics related to a number of available datasets 310 that are partially annotated. For example, the HumanML3D dataset included primarily body motion data (e.g., Modality=B for body). The IDEA400 dataset included some data about all three modalities (BHF for body, hand, and face). Other partially annotated datasets 310 include BAUM, Mixamo, and GRAB.

The annotations in these datasets 310 in some implementations were edited, augmented, labeled, quantified, and otherwise enhanced, and then converted into SMPL-X format, to create a unified motion dataset 320 for use in training the three separate VQ-VAE models 110*b*, 110*h*, 110*f* described herein. For example, the Mixamo dataset included high-quality body or hand motion data and text descriptions; however, the Mixamo dataset included hand pose offsets for a number of default poses that required correction. In some implementations, building the unified motion dataset 320 included establishing a mapping scheme to convert the joint positions in the Mixamo data into SMPL-X format.

In some implementations, building the unified motion dataset 320 included implementing mirror augmentation for all motion data and re-phrasing and augmenting mirror text descriptions.

The GRAB dataset included hand and body movement, but simplistic text descriptions. The simple text descriptions in several datasets 310 were edited and, in some implementations, expanded from a simple label to three or more comprehensive sentences, as described herein. In some implementations, building the unified motion dataset 320 included generating enhanced text descriptions using tools such as ChatGPT and GPT-4. For example, a raw label such as "zombie stumble to the right and fall, zombie stumbling" produces augmented text in the form of a series of sentences: "(1) A person, moving in a zombie-like manner, stumbles to the right and subsequently falls down. (2) Emulating the movements of a zombie, the individual lurches unsteadily towards the right before taking a fall. (3) In a style reminiscent of a zombie, the person staggers to the right and ultimately collapses."

The combined datasets were converted to a standard format (e.g., SMPL-X) to be consumed in model training. FIG. 3 is a table 300 of the statistics for the unified motion dataset 320. As shown, the unified motion dataset 320 in total includes 61.4K of sequence, 16.6M of frame, 115.3 hours of human motion, and 3.96M text words.

In some implementations, building the unified motion dataset 320 includes generating a pose representation 352 that includes a set of joint position vectors 327P and a set of joint rotation vectors 327R, as described herein with reference to mitigating jitter. Converting all the rotations into 6D rotation vectors produced smoother motion results. In general, a pose representation 352 as used herein is defined as a tuple of (r, b$^p$, b$^v$, v$^r$, c$^f$, h, j, f) where the vector r for a root joint can be expressed as: $r \in \mathbb{R}^4$ and the local body joint positions, velocities, and rotations in the root joint space can be expressed as: $b^p \in \mathbb{R}^{3 \times 21}$, $b^v \in \mathbb{R}^{3 \times 21}$, and $b^r \in \mathbb{R}^{6 \times 21}$ The binary features for the foot ground contacts can be expressed as: $c^f \in \mathbb{R}^4$.

The hand joint rotations in the wrist joint spaces can be expressed as: $h \in \mathbb{R}^{6 \times 30}$.

The jaw joint rotations related to face motion can be expressed as: $j \in \mathbb{R}^6$.

The facial expression feature in SMPL-X format can be expressed as: $f \in \mathbb{R}^{50}$.

Other pose representations, such as that used for the HumanML3D dataset, suffered from rotation information loss in the head and wrist joints, which caused body part rotation artifacts in some cases. The pose representation 352 as described herein animates the upper body using predicted SMPL-X rotations (e.g., to maintain smooth motions) and animates the lower body using reversed rotations from the predicted joint positions (e.g., to minimize foot sliding).

Experiments were conducted on the two-stage text-to-motion-X (T2M-X) system 1000 described herein. According to an example approach, the unified motion dataset 320 was shuffled and split into training (about 80% of the data), validation (about 10%), and test datasets (about 10%). For an example training set, the total motion length was 92.3 hours and it contained 49,100 text descriptions. All motion datasets were downsampled to 30 frames per second. The VAE expert models 110 were trained on different dataset combinations form the unified motion dataset 320.

In some implementations, for the VAE models 110, the settings included a codebook size of 512 by 512 and a downsampling rate of four. An optimizer (e.g., AdamW) with a batch size of 256 and a learning rate of "1e-4" was used to optimize the VAE models 110. A maximum token length of 128 (e.g., 17 seconds for raw motion data) when training the VAE models 110; with a padding strategy. Nine transformer layers were used for the GPT base 160 and for each GPT branch 170, with the hidden dimension of 512 and 16 heads. The weights on hand and face motions were used for next motion prediction. The weights on body-hand matching, body-face matching, and hand-face matching were used for consistency learning. The whole multi-indexing GPT model 150 was optimized with a batch size of 256 by the AdamW optimizer with $[\beta_1, \beta_2]=[0.5, 0.99]$ and a typical step learning rate. All models were trained on a single A100 80 GB GPU. According to one example approach, it took approximately 16 hours for the VAE models 110 to reach convergence; and 48 hours for the multi-indexing GPT model 150 to reach convergence.

FIG. 4 is a table 400 of data associated with different methods, comparing the system 1000 described herein ("T2M-X") with other systems. For evaluation purposes, the text descriptions and generated motions were converted to embedding features by the pretrained network in order to calculate several metrics. Frechet Inception Distance (FID) represents the distribution distance between the real and the generated motion on the extracted motion features. Diversity represents the average Euclidean distances of 300 pairs of motion features randomly sampled from a set. Multi-modality ("MModality") represents the average Euclidean distances of 10 pairs of generated motion features from the same text description. Multi-modal Distance ("MM Dist") represents the average Euclidean distance between each text feature and the generated motion feature from this text. R-Precision represents the average motion-to-text retrieval accuracy, as ranked by Multi-modal Distance.

The table 400 shown in FIG. 4 includes values associated with the real input data and with the VQ-VAE models 100.

The text-to-motion-X (T2M-X) system 1000 described herein was compared to a baseline model 405 known as "T2M-GPT" and a HumanML3D dataset. For comparison, values were obtained for the T2M-X system 1000 without consistency loss ("T2M-X w/o cl") and with consistency loss ("T2M-X w/cl"). The table 400 includes R-Precision values 410, FID values 420, MM Dist values 430, Diversity values 440, and MModality values 450. The baseline model 405 ("T2M-GPT") falls short in every category except Diversity, primarily because the HumanML3D dataset is partially annotated for body motion alone.

Figure 5:
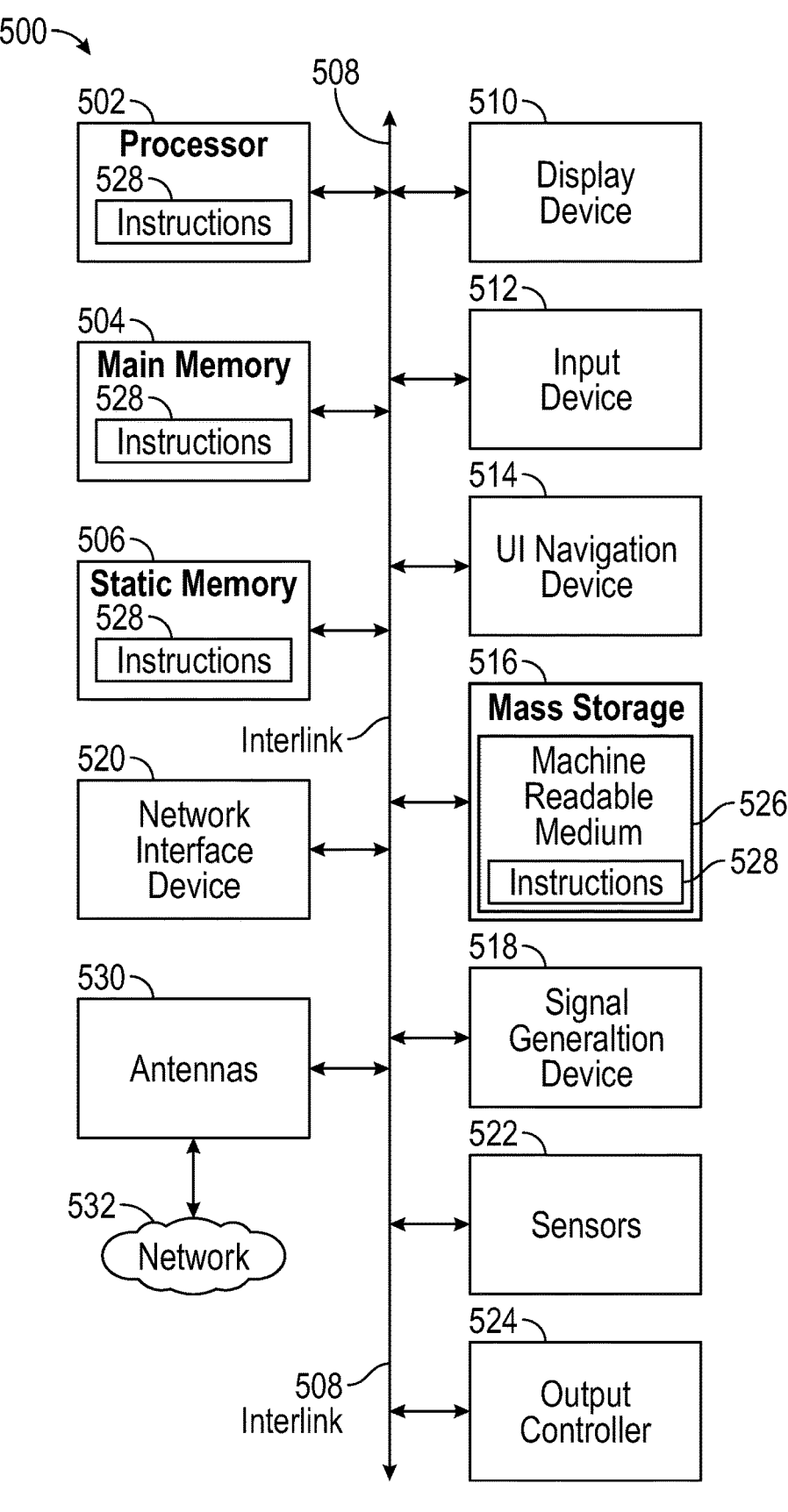
FIG. 5 is a block diagram of a sample configuration of a machine adapted to implement the systems and methods described herein.

FIG. 5 illustrates an example configuration of a machine 500 including components that may be incorporated into the processor 502 adapted to manage the systems and perform the processes described herein. The techniques described herein may be used with one or more of the computing systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computing systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computing system. As an example, implementations can include distributed processing, component/object distributed processing, and parallel processing. Moreover, virtual computing system processing can be constructed to implement one or more of the techniques or functionalities, as described herein.

FIG. 5 illustrates a block diagram of an example of a machine 500 upon which one or more configurations may be implemented. In alternative configurations, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. In sample configurations, the machine 500 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 500 may serve as a workstation, a front-end server, or a back-end server of a communication system. Machine 500 may implement the methods described herein by running the software used to implement the features described herein. Further, while only a single machine 500 is illustrated, the term "machine" shall also be taken to include any collection of machines that individually or jointly execute a set (or multiple sets) of instructions to perform any one or more of the methodologies discussed herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computing systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computing system or processor) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510 (shown as a video display), an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 522. Example sensors 522 include one or more of a global positioning system (GPS) sensor, compass, accelerometer, temperature, light, camera, video camera, sensors of physical states or positions, pressure sensors, fingerprint sensors, retina scanners, or other sensors. The machine 500 may include an output controller 524, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 516 may include a machine readable medium 526 on which is stored one or more sets of data structures or instructions 528 (e.g., software) embodying or utilized by any one or more of the techniques or functions described herein. The instructions 528 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 526 is illustrated as a single medium, the term "machine readable medium" may include a single medium or multiple media (e.g., at least one of a centralized or distributed database, or associated caches and servers) configured to store the one or more instructions 528. The term "machine readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 528 may further be transmitted or received over communications network 532 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas 530 to connect to the communications network 532. In an example, the network interface device 520 may include a plurality of antennas 530 to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

The features and flowcharts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate the functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system or host computer of a service provider into the computer platforms of the smartwatch or other portable electronic devices. Thus, another type of media that may bear the programming, media content or metadata files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as the main memory of such a computer platform. Tangible transmission media include coaxial cables; copper wire and fiber optics, including the wires that comprise a bus within a computing system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

FIG. 6A is a table 600 of data associated with evaluation results using two different datasets: the HumanML3D dataset and the unified motion dataset 320 ("T2M-X Dataset") described herein. The text-to-motion-X (T2M-X) system 1000 described herein was trained on each of the two datasets, respectively, and compared to the real data. The results for the model as trained on the unified motion dataset 320 ("T2M-X Dataset") surpasses the results for the model as trained on the HumanML3D dataset (for both test datasets). This result demonstrates that the unified motion dataset 320 performs better because it includes data converted from a variety of other, partially annotated datasets. Qualitative results for the three models (e.g., observing the resulting animations associated with each test dataset) confirmed that the T2M-X system 100 as trained on the unified motion dataset 320 produces superior results.

FIG. 6B is a table 650 of evaluation data associated with a number of modality pairs 660 and methods 670. For evaluating whole-body motion and consistency between and among different body parts, the feature extractor networks were trained on respective dataset combinations for each modality pair 660 (e.g., body, hand; body, face; and hand, face). The results for the T2M-X system 1000 with consistency loss ("w/cl") demonstrate an improvement in the coherence of the motion of different body parts.

FIG. 7 is a table 700 of data associated with a set of two hyperparameters; specifically, the eta values ($\eta_1$ and $\eta_2$) which are used by the GPT model 150 to calculate the loss function 154 ($L_{GPT}$) in equation 4. The eta values ($\eta_1$ and $\eta_2$) (also referred to as branch weights) are used to adjust the loss weight related to hand motion and facial expression, respectively. In some implementations, $\eta_1$ represents a hand hyperparameter 155$h$ for adjusting a hand loss weight 156$h$ associated with the hand motion, and $\eta_2$ represents a face hyperparameter 155$f$ for adjusting a face loss weight 156$f$ associated with the face expression. In some implementations, the methods described herein include optimizing the eta values ($\eta_1$ and $\eta_2$) for peak performance. FIG. 7 shows the results associated with a number of test values 710$h$ for $\eta_1$ and a number of test values 710$f$ for $\eta_2$. The results indicate peak model performance at $\eta_1=0.1$ and $\eta_2=0.1$.

Figure 8:
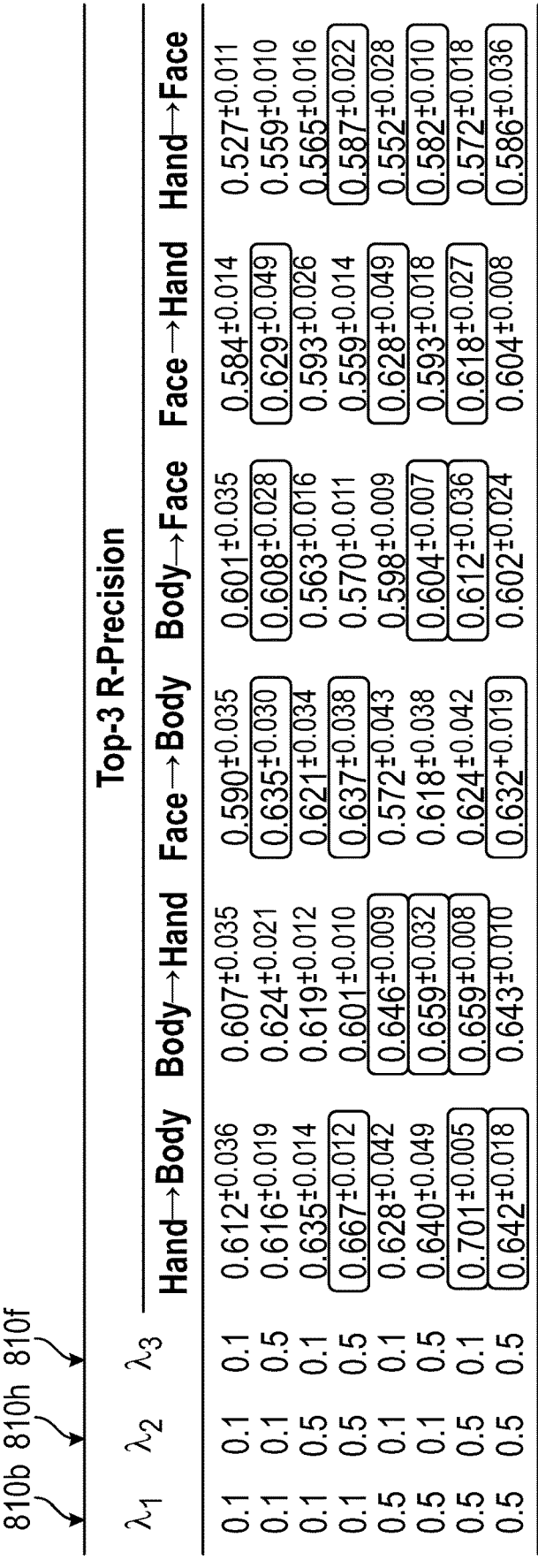
FIG. 8 is a table of data associated with a set of three hyperparameters.

FIG. 8 is a table 800 of data associated with a set of three hyperparameters; specifically, the lambda values $\lambda_1$, $\lambda_2$, $\lambda_3$ which are used to calculate the consistency loss 185 ($L_{CONSIST}$) in equation 6. In some implementations, the methods described herein include optimizing the lambda values for peak performance. FIG. 8 shows the results associated with a number of test values 810$b$, 810$h$, 810$f$ for the lambda values $\lambda_1$, $\lambda_2$, $\lambda_3$, respectively, and the R-Precision values for a number of modality pairs (e.g., hand-body, etc.). The results indicate peak model performance for lambda values of $\lambda_1=0.5$, $\lambda_2=0.5$, and $\lambda_3=0.1$.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of generating an animation, comprising:
   training a body variational autoencoder (VAE) using a unified motion dataset that is based on a plurality of partially annotated datasets, wherein the body VAE comprises a body encoder, a body codebook, and a body decoder, and wherein the body VAE generates a body motion vector;
   training a hand VAE using the unified motion dataset, wherein the hand VAE comprises a hand encoder, a hand codebook, and a hand decoder, and wherein the hand VAE generates a hand gesture vector;
   training a face VAE using the unified motion dataset, wherein the face VAE comprises a face encoder, a face codebook, and a face decoder, and wherein the face VAE generates a face expression vector;

training a generative pre-trained transformer (GPT) model using the vectors generated by each VAE and a plurality of text conditions;

generating a GPT body codebook comprising a next body motion token, a GPT hand codebook comprising a next hand gesture token, and a GPT face codebook comprising a next face expression token; and generating an animation based on the GPT codebooks, the next tokens, and a text input.

2. The method of claim 1, further comprising:

selecting a plurality of partially annotated datasets, each comprising at least one of a text prompt, a body motion dataset, a hand gesture dataset, or a face expression dataset; and building the unified motion dataset in a standard format based on the selected datasets.

3. The method of claim 1, wherein training the GPT model comprises:

generating, for each of the plurality of text conditions, a concatenated text comprising a previous body motion token, a previous hand gesture token, a previous face expression token, wherein the next tokens are conditioned upon the previous tokens.

4. The method of claim 1, wherein generating the GPT codebooks comprises:

generating the GPT body codebook using a body GPT branch;

generating the GPT hand codebook using a hand GPT branch;

generating the GPT face codebook using a face GPT branch; and providing a single joint space for processing data associated with the body GPT branch, the hand GPT branch, and the face GPT branch.

5. The method of claim 4, wherein training the GPT model comprises:

estimating in the single joint space a body part motion consistency loss, wherein the body part motion consistency loss is based on a contrastive loss, and a relative loss value associated with each of the GPT branches; and imposing a sequence length consistency sampler across the GPT codebooks.

6. The method of claim 1, wherein training the body VAE, training the hand VAE, and training the face VAE comprises:

optimizing each VAE based on a final loss, wherein the final loss comprises a reconstruction loss, a codebook alignment loss, and a commitment loss.

7. The method of claim 1, wherein training the GPT model comprises:

calculating a GPT loss comprising three cross-entropy loss values, a weighted hand loss value, and a weighted face loss value.

8. The method of claim 1, wherein training the GPT model comprises:

generating a pose representation comprising a set of joint position vectors and a set of joint rotation vectors for each record in the unified motion dataset;

measuring a jitter associated with at least one of the next body motion token, the next hand gesture token, or the next face expression token;

applying a low-pass filter to mitigate the jitter;

selectively animating an upper body portion using a predicted set of upper-body joint rotations expressed in terms relative to the pose representation; and selectively animating a lower body portion using a reversed set of lower-body joint rotations expressed in terms relative to the pose representation.

9. A system for generating an animation, comprising:

a body variational autoencoder (VAE) trained using a unified motion dataset that is based on a plurality of partially annotated datasets, wherein the body VAE comprises a body encoder, a body codebook, and a body decoder, and wherein the body VAE generates a body motion vector;

a hand VAE trained using the unified motion dataset, wherein the hand VAE comprises a hand encoder, a hand codebook, and a hand decoder, and wherein the hand VAE generates a hand gesture vector; and a face VAE trained using the unified motion dataset, wherein the face VAE comprises a face encoder, a face codebook, and a face decoder, and wherein the face VAE generates a face expression vector;

a multi-indexing generative pre-trained transformer (GPT) model trained using the vectors generated by each VAE and a plurality of text conditions;

a GPT body codebook comprising a next body motion token, a GPT hand codebook comprising a next hand gesture token, and a GPT face codebook comprising a next face expression token; and an animation based on the GPT codebooks, the next tokens, and a text input.

10. The system of claim 9, wherein each of the plurality of partially annotated datasets comprises at least one of a text prompt, a body motion dataset, a hand gesture dataset, or a face expression dataset.

11. The system of claim 9, comprising:

a text encoder for generating, for each of the plurality of text conditions, a concatenated text comprising a previous body motion token, a previous hand gesture token, a previous face expression token, wherein the next tokens are conditioned upon the previous tokens.

12. The system of claim 9, comprising:

a body GPT branch for generating the GPT body codebook;

a hand GPT branch for generating the GPT hand codebook;

a face GPT branch for generating the GPT face codebook;

a single joint space for processing data associated with the body GPT branch, the hand GPT branch, and the face GPT branch.

13. The system of claim 12, comprising:

a body part motion consistency loss based on a contrastive loss and a relative loss value associated with each of the GPT branches; and a sequence length consistency sampler imposed across the GPT codebooks.

14. The system of claim 9, comprising:

a final loss for optimizing each VAE, wherein the final loss comprises a reconstruction loss, a codebook alignment loss, and a commitment loss.

15. The system of claim 9, comprising:

a GPT loss associated with the GPT model, wherein the GPT loss comprises three cross-entropy loss values, a weighted hand loss value, and a weighted face loss value.

16. The system of claim 9, comprising:

a jitter detector for identifying a jitter associated with at least one of the next body motion token, the next hand gesture token, or the next face expression token;

a low-pass filter for mitigating the jitter;

an animation modification comprising selectively animating an upper body portion using a predicted set of upper-body joint rotations and selectively animating a lower body portion using a reversed set of lower-body joint rotations.

17. A non-transitory computer-readable medium including instructions for generating an animation, the instructions, when executed by a processor, configure the processor to perform functions including:

selecting a plurality of partially annotated datasets, each comprising at least one of a text prompt, a body motion dataset, a hand gesture dataset, or a face expression dataset;

building a unified motion dataset in a standard format based on the selected datasets;

training a body variational autoencoder (VAE) using the unified motion dataset, wherein the body VAE comprises a body encoder, a body codebook, and a body decoder, and wherein the body VAE generates a body motion vector;

training a hand VAE using the unified motion dataset, wherein the hand VAE comprises a hand encoder, a hand codebook, and a hand decoder, and wherein the hand VAE generates a hand gesture vector;

training a face VAE using the unified motion dataset, wherein the face VAE comprises a face encoder, a face codebook, and a face decoder, and wherein the face VAE generates a face expression vector;

training a generative pre-trained transformer (GPT) model using the vectors generated by each VAE and a plurality of text conditions;

generating a GPT body codebook comprising a next body motion token, a GPT hand codebook comprising a next hand gesture token, and a GPT face codebook comprising a next face expression token; and generating an animation based on the GPT codebooks, the next tokens, and a text input.

18. The medium of claim 17, wherein training the GPT model comprises:

generating, for each of the plurality of text conditions, a concatenated text comprising a previous body motion token, a previous hand gesture token, a previous face expression token, wherein the next tokens are conditioned upon the previous tokens.

19. The medium of claim 17, wherein training the GPT model comprises:

estimating in a single joint space a body part motion consistency loss, wherein the body part motion consistency loss is based on a contrastive loss, and a relative loss value associated with each of a body GPT branch, a hand GPT branch, and a face GPT branch.

20. The medium of claim 17, wherein training the body VAE, training the hand VAE, and training the face VAE comprises optimizing each VAE based on a final loss, wherein the final loss comprises a reconstruction loss, a codebook alignment loss, and a commitment loss, and wherein training the GPT model comprises calculating a GPT loss comprising three cross-entropy loss values, a weighted hand loss value, and a weighted face loss value.

* * * * *